United States Patent Office 3,841,964
Patented Oct. 15, 1974

3,841,964
DEVICE FOR HANDLING THE ELEMENTS OF A NUCLEAR REACTOR CORE
Raymond Dumayne, Paris, France, assignor to Commissariat a l'Energie Atomique, and Societe Creusot-Loire, both of Paris, France
Filed Jan. 15, 1973, Ser. No. 323,635
Claims priority, application France, Jan. 20, 1972, 7201863
Int. Cl. G21c 19/02
U.S. Cl. 176—30
5 Claims

ABSTRACT OF THE DISCLOSURE

The device is primarily intended for use in fast reactors and comprises a first plug which is centered on the axis of the reactor core, a second rotating plug mounted eccentrically with respect to the axis of the first plug and a third plug mounted eccentrically with respect to the axis of the second plug, the eccentric displacement of the second plug with respect to the first being equal to the eccentric displacement of the third plug with respect to the second.

---

Openings are formed in the second and third plugs in order to provide access to the interior of the reactor containment vessel and the second plug is fitted with a fourth rotating plug which is mounted eccentrically with respect to the axis of the second plug, an opening being also formed in the fourth plug in order to provide access to the interior of the containment vessel.

This invention relates to a device for handling the fuel elements which form a nuclear reactor core, especially in so-called fast reactors. The active portion of the core consists of a juxtaposed assembly of fuel elements which are located on a lattice having a predetermined pitch and are made up of canned fuel pins containing fissile material. These assemblies are surrounded by an annular blanket formed of different assemblies which are geometrically similar to the first but contain pins of fertile material. The blank assembly is in turn surrounded by a zone formed of dummy assemblies which are usually constructed of steel and the design function of which is to provide the fissile and fertile assemblies with mechanical cohesion and to shield the structures located outside the reactor core against neutron radiation. In a reactor of this type, the dummy fuel-assembly zone is preferably surrounded externally by a storage zone which is intended to accommodate either spent fuel assemblies derived from the active portion of the reactor core and stored temporarily in this zone prior to removal from the reactor vessel, or fresh fuel assemblies which are intended to replace the spent assemblies within the core, or finally either fertile or dummy assemblies which are intended to be substituted for a number of corresponding assemblies in their respective regions.

The aim of the present invention is to provide a device for handling the core elements in a reactor of the type mentioned earlier so as to make it possible on the one hand at the time of reactor shut-down to transfer fissile, fertile or dummy assemblies from their core locations to the storage zone and in particular to a discharge station provided in said zone or, conversely, to transfer fresh assemblies from said storage zone to the reactor core and on the other hand, during reactor operation, to discharge previously-stored fissile assemblies and to replace these latter by fresh or dummy assemblies.

Handling devices have already been constructed for nuclear reactors so designed that the reactor tank containing the core has a sufficiently large diametral dimension to ensure that the fissile assemblies in particular can be stored in an annular zone which is located at a distance from said core. After a sufficient storage time which permits suitable reduction of their residual power, these assemblies can be discharged, that is to say removed from the containment vessel which surrounds the reactor tank without thereby entailing the need for reactor shutdown.

Moreover, it has already been proposed to construct handling devices of this type by making provision in the shield slab or top portion of the containment vessel for a system consisting of a number of plugs rotatably mounted one inside the other and suitably disposed in eccentric relation so that a core access opening which is formed through the inner plug, for example, may accordingly be brought into position above any predetermined core assembly as a result of successive movements of rotation of said plug and the surrounding plugs. A handling device such as a winch or the like can then engage the corresponding assembly and either withdraw the assembly directly from the containment vessel through the opening in order to transfer it into a hood or like machine which is placed over said opening and ensures continuity of containment of the vessel structure or, as a result of further relative movements of rotation of the plugs, bring said assembly into the vessel to a position above the storage zone in which the assembly is then deposited. In the design solution which has just been mentioned, it is only necessary to ensure that the height of the free space within the containment vessel between the top portion of the reactor core and the shield slab is at least equal to the height of the assemblies to be handled and that the combined movements of rotation of the plugs are such that the access opening can be brought vertically opposite to the storage zone.

Should the need arise, the access opening can be provided in some cases with an articulated assembly of the handling-arm type which permits a complementary displacement of the assemblies during transfer in order that these latter may be permitted to reach a storage zone located at a greater distance from the region which is covered directly by the system of rotating plugs.

Although the arrangements described in the foregoing do in fact provide a practical solution to most of the problems involved in the handling of the elements which constitute a nuclear reactor core, these arrangements are found to be ineffective in the event that the rotating plug which carries the core access opening is intended to be strictly centered on the reactor core during operation in order that a core lid which is suspended beneath said plug and supports instruments for controlling the operation of the reactor may thus be suitably positioned, especially in vertically overhead relation to the fissile assemblies. The combination of movements of rotation of the different rotating plugs, in particular those which are necessary in order to gain access to the storage zone, in fact causes the displacement of the core lid. In all cases, this entails the need to carry out the handling operation after shutdown of the reactor.

The aim of this invention is to overcome the disadvantages noted above by making it possible during operation of the reactor to carry out the handling of assemblies which have previously been brought into the storage zone without entailing any change in the position of the core lid with respect to the axis of the reactor core as a result of the movements of the different plugs.

To this end, the handling device under consideration comprises, mounted within a shield slab which closes the reactor core containment vessel, a first rotating plug of large diameter which is centered on the axis of said reactor core, a second rotating plug mounted eccentrically with respect to the axis of said first plug, and a third rotating plug mounted eccentrically with respect to the axis of said second plug, the eccentric displacement of the second plug with respect to the first being equal to the eccentric displacement of the third plug with respect to the second plug so that when the first and the third plugs are in coaxial relation, a core lid which is suspended beneath the third plug can be placed strictly above and in axial alignment with the reactor core during operation of the reactor. The handling device is characterized in that the second and third plugs are provided through the shield slab with access openings to the interior of the containment vessel and that the second plug is fitted with a fourth rotating plug mounted eccentrically with respect to the axis of said second plug, said fourth plug being in turn provided with an access opening to the interior of said containment vessel.

As an advantageous feature, the openings which provide access to the interior of the containment vessel and are formed through the third and the four rotating plugs can be fitted either with means for grappling and transferring the core elements or with seal plugs for closing-off said openings. In particular, the grappling and transferring means mounted in the access opening of the third plug serves to handle the elements between their positions within the reactor core and an annular storage zone, the necessary displacements being carried out by means of combined relative movements of rotation of the first, second and third rotating plugs.

On the other hand, the grappling and transferring means which are mounted within the access opening of the fourth plug serves only to handle the elements between their positions within the storage zone and a discharge station which is located within said zone and comprises a flask for receiving the handled element, the assembly which is formed by the flask and the element contained therein being transferred through the access opening formed in the second plug to a charge/discharge hood which is mounted on the shield slab outside the containment vessel opposite to and above said opening.

Further characteristic features of a handling device as constructed in accordance with the invention will become apparent from the following description of one exemplified embodiment which is given by way of indication without any limitation being implied, reference being made to the accompanying drawings, wherein.

Figure 1:
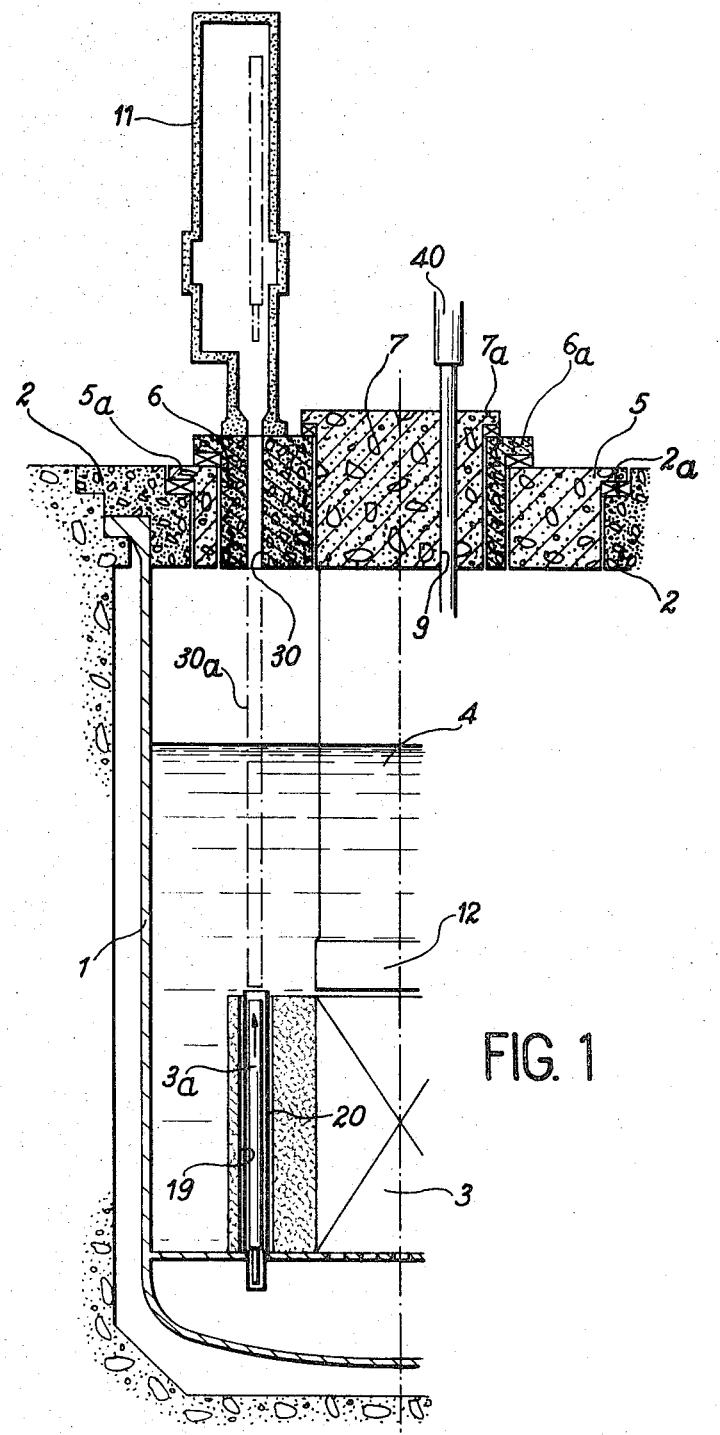
FIG. 1 is a diagrammatic longitudinal sectional view of a nuclear reactor which is equipped with a handling device in accordance with the invention.

In FIG. 1, the reference numeral 1 designates the primary tank of a nuclear reactor and especially a socalled fast rector, sand tank 1 being closed at the top by a shield slab 2 of substantial thickness which provides external protection against radiations. The reactor core 3 is mounted within the interior of the tank 1 and is formed by means of assemblies such as those designated by the reference 3a, the practical constructional detail of which does not have any direct bearing on the invention; these assemblies are usually mounted in adjacent relation within the reactor core and disposed vertically on a predetermined lattice in such a manner that the complete assembly forms concentric zones which are more especially defined hereinafter. The core which is thus formed is surrounded by liquid sodium 4 which is contained within the tank 1 and provides suitable cooling of the assemblies 3a during operation.

The tank 1 is closed at the top by a first plug 5 which is placed within the shield slab 2 and has the general shape of a circular disc having a thickness substantially equal to that of said slab, said plug being placed within a hole which is formed in the slab in coaxial relation with the reactor core 3; there is formed at the top portion of the plug 5 a radial annular flange 5a which is placed within an open channel 2a formed on the top edge of the hole of the shield slab 2. Standard sealing and rotational bearing means such as dynamic seals and bearings (not shown in the drawings) are mounted between the faces in the form of circular rings of the annular flange 5a and of the channel 2a.

A second circular plug 6 which is provided at the top with a radial annular flange 6a has a smaller diameter than that of the first plug 5 and is similarly mounted in a hole formed in this latter; however, said hole is located in eccentric relation to the axis of the first plug and consequently to the axis of the reactor core 3. The height of the second plug 6 is adapted at the time of assembly between the ring-shaped face of the annular flange 6a and the top face of the plug 5, standard sealing and rotational bearing means being also provided so as to permit independent rotational motion of the plug 6 with respect to the first plug 5.

Figure 2:
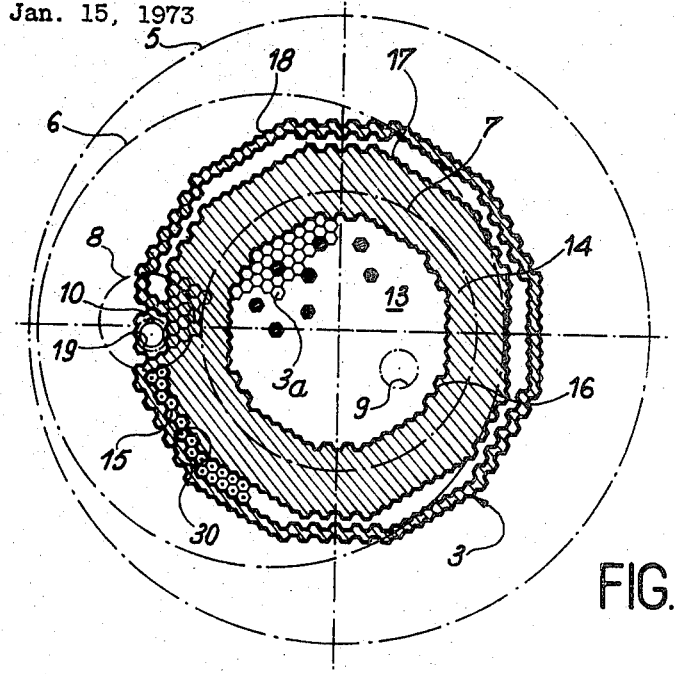
FIG. 2 is a top view to a slightly larger scale and showing the reactor core in accordance with FIG. 1, and more especially the distribution of fissile, fertile and dummy assemblies to be handled as well as the annular storage zone which is provided at the periphery of the reactor core.

A third and a fourth plug as designated respectively by the reference numerals 7 and 8 (and as shown in FIGS. 1 and 2), which are similar in structure to the plugs 5 and 6 aforesaid, have even smaller diameters and are mounted in adjacent relation on radial annular flanges such as the flange 7a in the case of the plug 7, within holes formed in the second plug 6. Said plugs 7 and 8 are also provided as in the previous cases with sealing and rotational bearing means.

In accordance with a particular feature of the invention, the third plug 7 is mounted eccentrically with respect to the axis of the second plug 6, the eccentric displacement of said second plug with respect to the first being exactly equal to the eccentric displacement of the third plug with respect to the second so that, in a suitable position of these three elements, the plugs 5 and 7 are consequently coaxial and their common axis coincides with the axis of the reactor core 3.

It is further apparent from FIG. 2 that the fourth plug 8 has a smaller diameter than the third plug 7 and that the plugs 7 and 8 have holes or access openings 9 and 10 respectively which provide admission through the containment vessel to the core which is located within the primary tank. The holes aforesaid are located in eccentric relation to the corresponding axes of the plugs and fitted in a manner known *per se* either with a grappling and transfer unit 40 which serves to handle the assemblies 3a of the reactor core 3 as will be explained hereinafter, or with seal plugs. In addition, a complementary opening 30 in the second plug 6 is associated on the top face of the shield slab 2 with a charge/discharge hood 11 which is positioned directly over said opening 30 in order that either fresh or spent fuel assemblies may be introduced into or withdrawn from the vessel via a guide tube 30a, either from or back to a handling station 19 provided in the storage zone which surrounds the reactor core.

Finally, in accordance with a particular feature of the reactor under consideration, the third plug 7 is associated with a core lid 12 which is mounted within the interior of the tank 1 and can be brought into position directly above the reactor core 3. Said lid 12 is suspended from the plug 7 and accurately positioned in vertically opposite and coaxial relation to the core during operation of the reactor; this makes it necessary as a function of the relative diametral dimensions of the plugs and of their eccentric relation to ensure that the third plug 7 should be coaxial with the first plug 5.

The top view of the reactor core which is shown in FIG. 2 serves to explain the relative arrangement of the different elements to be handled and especially to be transferred from one position to another within said core. Thus the core 3 comprises a central portion 13 formed by a juxtaposed array of fissile assemblies disposed on a predetermined lattice, said central portion 13 being surrounded by a first zone or annular array 14 which is formed first of all by fertile assemblies and then by dummy assemblies having a geometry which is substantially identical with that of the fissile assemblies. Finally, the annular array 14 is surrounded by a second zone 15 or so-called storage zone which is reserved for positioning certain fuel assemblies prior to transfer of these latter either into the reactor core or towards the charge/discharge hood 11. The zones 13, 14 and 15 as thus defined are contiguous and adjacent but, for the sake of enhanced clarity, are defined in the drawing by thick lines which serves to indicate their external limits and are designated respectively by the references 16, 17 and 18.

In addition, the different plugs of the shield slab are shown in chain-dotted lines in FIG. 2. Thus the third plug 7 is centered on the axis of the reactor core and coaxial with the first plug 5 whilst the plug 8 carried by the second plug 6 is mounted eccentrically. The peripheral storage zone 15 finally provides a special position which constitutes the charge/discharge station 19. Said station has a free compartment in which a refuelling flask 20 is placed. Said flask can be removed from the reactor containment vessel through the opening 30 of the plug 6 in order to be transferred to the interior of the hood 11 (shown in FIG. 1).

The method of handling which is carried out by means of the device in accordance with the invention is as follows: in a first step and during reactor shut-down, the following operations are carried out by means of the grappling unit 40 after this latter has been positioned over the opening 9 of the third plug 7 while also combining the movements of rotation of the first, second and third plugs 5, 6 and 7. The initial operation consists in transferring into the storage zone 15 irradiated and spent fissile assemblies which have been taken from the central zone 13 of the reactor core, said assemblies being placed in temporary storage in said zone for a sufficient period of time to permit a suitable reduction of their residual power. At the same time, the same unit is employed for the purpose of removing the fresh assemblies which have previously been placed in the storage zone 15 and positioning these latter within the reactor core so as to replace the irradiated fissile assemblies which have just been withdrawn. Similarly, the fertile elements and dummy elements of the zone 14 are also displaced but are conveyed directly to the charge/discharge station 19; these fertile or dummy elements can be immediately removed from the reactor vessel through the opening 30 and the hood 11 without entailing the need for periods of radioactive decay as is the case with the fissile assemblies.

In a second step and during operation of the reactor, further operations are performed in accordance with the invention: these consist in particular in carrying out the transfer of the irradiated fissile assemblies which, as stated earlier, have been conveyed within the storage zone up to the charge/discharge station 19 within the flask 20 from which said irradiated fissile assemblies are subsequently withdrawn through the opening 30 in the hood 11 after a residence time of suitable duration which ensures that the residual activity of said assemblies is of sufficiently low values. The locations vacated within the storage zone by the elements which have thus been discharged can then be filled with fresh dummy assemblies. During these operations which are carried out at the time of operation of the reactor, the core lid 12 (shown in FIG. 1) which is suspended from the third plug 7 must remain stationary with respect to the reactor core. This only calls for relative movements of rotation of the first plug 5 and of the fourth plug 8 in accordance with the procedure which will be explained below with reference to FIG. 5, whilst FIGS. 3 and 4 relate to the operations carried out during reactor shut-down.

Figure 3:
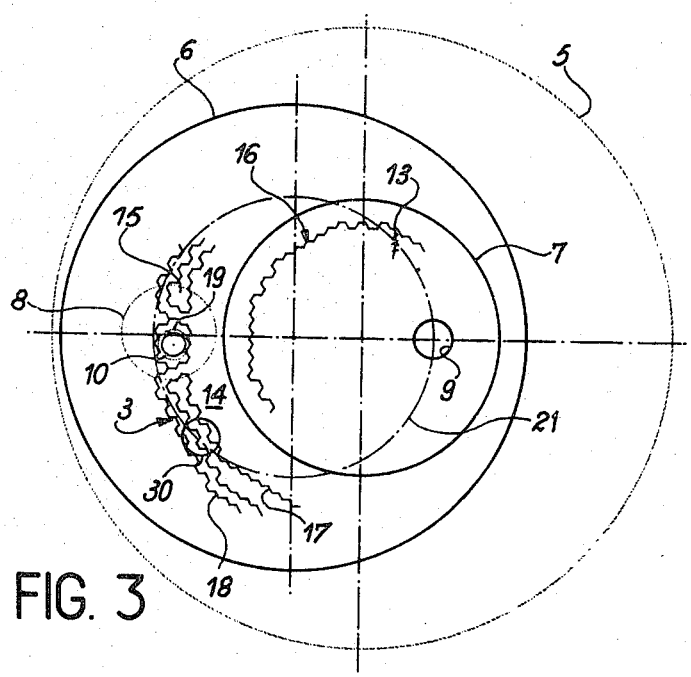
FIGS. 3, 4 and 5 are diagrammatic top views of rotating plugs which are mounted within the shield slab of the reactor containment vessel and designed in accordance with the invention to perform the handling of core elements.

FIG. 3 thus illustrates a first possibility of operation which consists in employing only the combined movements of rotation of the second and third plugs 6 and 7 so as to bring the access opening 9 of the third plug 7 into position above any reactor core assembly located in a zone defined by the circumference 21 which is centered on the axis of the plug 6 and the radius of which corresponds to the maximum eccentric displacement of said opening 9. Said zone includes in particular the storage station 19.

Figure 4:
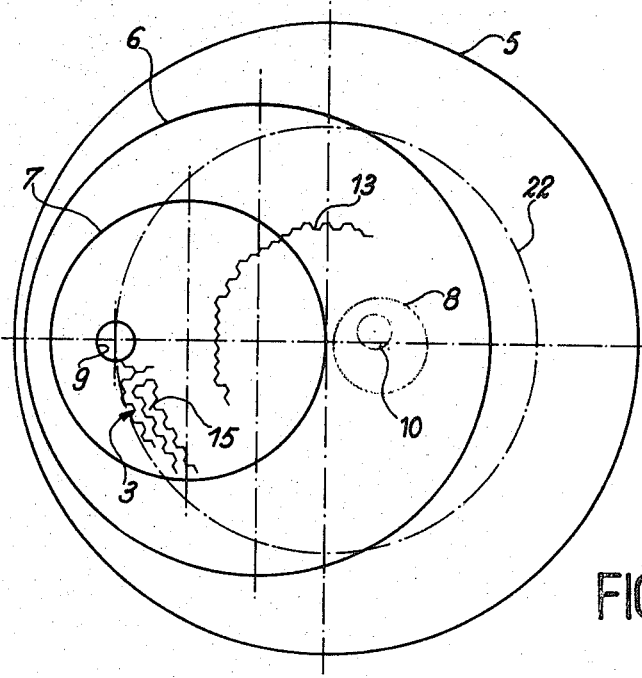

Similarly, FIG. 4 illustrates another possibility of relative displacement of the access opening 9 which is obtained by stopping the third plug 7 in any predetermined position and by causing the relative movement of rotation of the first plug 5 and the second plug 6 with respect to each other. It is apparent in this case that the opening 9 is capable of displacement within a circular zone 22 which is centered on the axis of the first plug 5; said zone 22 partially encloses the zone 21 mentioned earlier (and shown in FIG. 3) while extending to a substantial distance beyond this latter. It is thus possible to gain access to the entire reactor core and the whole storage zone 15.

Figure 5:
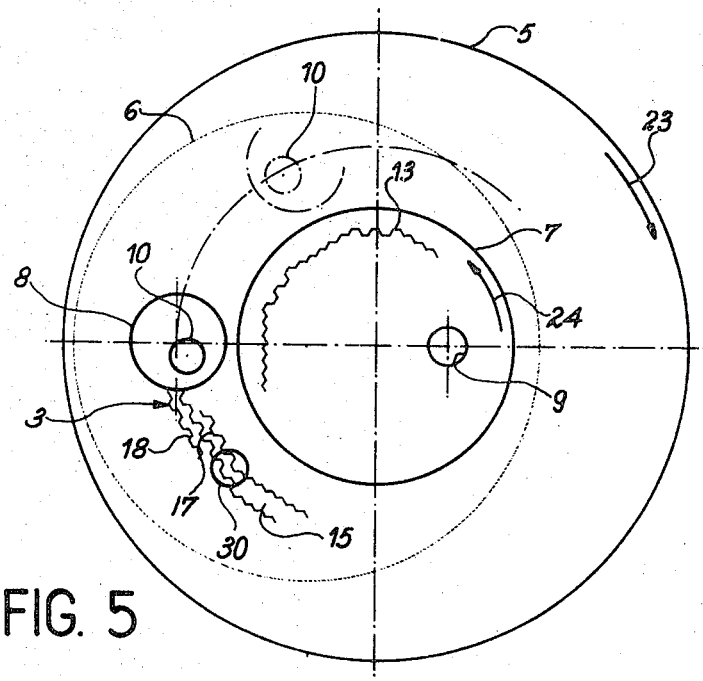

FIG. 5 illustrates the different procedure which is adopted during operation of the reactor and in which the third plug 7 is continuously centered on the axis of the reactor core 3 in coaxial relation with the first plug 5. In this case, when the first plug 5 is endowed with a movement of rotation about its own axis in the direction of the arrow 23, the third plug 7 which is coaxial therewith must be driven in an opposite movement of rotation in the direction of the arrow 24, this movement being obtained by means of an epicyclic gear train (not shown) or by any other suitable means, whilst the second plug 6 is rendered motionless at the same time with respect to the first plug 5. Handling of the assemblies and in particular the irradiated assemblies which are stored in the zone 15 is accordingly performed by means of the unit 40 which is positioned over the fourth plug 8, the eccentric position of which makes it possible during rotation of the first plug 5 to reach all the assemblies of said storage zone and to bring them one by one into the flask 20 so as to discharge them through the opening 30 and the hood 11.

The advantages of the handling device considered are readily apparent from the foregoing and can be summarized as follows: in the first place, the irradiated fissile assemblies can be stored within an annular zone which is provided at the periphery of the reactor core, thus making it possible to limit the transverse dimensions of the tank which contains this latter. In the second place, unloading of the stored irradiated assemblies can be carried out while the reactor is in operation, thereby reducing the cost of immobilization of fuel. Finally, the core lid which contains the instrumentation and control equipment can be carried by a single structure consisting in this case of a special plug which can be brought into position and stationarily fixed with respect to the reactor core throughout the period of operation.

It should be clearly understood that the invention is not limited solely to the exemplified embodiment which has been described with reference to the drawings but extends on the contrary to all alternative forms.

What we claim is:

1. A device for handling the elements of a nuclear reactor core and comprising, mounted within a shield slab which closes the reactor core containment vessel, a first rotating plug of large diameter which is centered on the axis of said reactor core, a second rotating plug mounted eccentrically with respect to the axis of said first plug, and a third rotating plug mounted eccentically with respect to the axis of said second plug, the eccentric displacement of the second plug with respect to the first being equal to the eccentric displacement of the third plug with respect to the second plug so that when the first and third plugs are in coaxial relation, a core lid which is suspended beneath the third plug can be placed strictly above and in axial alignment with the reactor core during operation of the reactor, wherein the second and third plugs are provided through the shield slab with access openings to the interior of the containment vessel and wherein the second plug is fitted with a fourth rotating plug mounted eccentrically with respect to the axis of said second plug, said fourth plug being in turn provided with an excess opening to the interior of said containment vessel.

2. A handling device according to claim 1, wherein the openings which provide access to the interior of the containment vessel and are formed through the third and the fourth rotating plugs can be fitted either with means for grappling and transferring the core elements or with seal plugs for closing-off said openings.

3. A handling device according to claim 2, wherein the grappling and transferring means mounted in the access opening of the third plug serves to handle the elements between their positions within the reactor core and an annular storage zone, the necessary displacements being carried out by means of combined relative movements of rotation of the first, second and third rotating plugs.

4. A handling device according to claim 2, wherein the grappling and transferring means which are mounted within the access opening of the fourth plug serves only to handle the elements between their positions within the storage zone and a discharge station which is located within said zone and comprises a flask for receiving the handled element.

5. A handling device according to claim 4, wherein the assembly which is formed by the receiving flask and the element contained therein is transferred through the access opening formed in the second plug to a charge/discharge hood which is mounted on the shield slab outside the containment vessel opposite to and above said opening.

References Cited

UNITED STATES PATENTS 3,322,637   5/1967   Middleton et al. _____ 176—30

FOREIGN PATENTS 434,497   10/1967   Switzerland _____ 176—30

HARVEY E. BEHREND, Primary Examiner

U.S. Cl. X.R.

176—87